United States Patent [19]

Pascale et al.

[11] Patent Number: 5,274,236
[45] Date of Patent: Dec. 28, 1993

[54] METHOD AND APPARATUS FOR REGISTERING TWO IMAGES FROM DIFFERENT SENSORS

[75] Inventors: Michael V. Pascale, Millersville; Thomas J. Neufelder, Pasadena, both of Md.

[73] Assignee: Westinghouse Electric Corp., Pittsburgh, Pa.

[21] Appl. No.: 991,808

[22] Filed: Dec. 16, 1992

[51] Int. Cl.$^5$ .............................. G02B 26/10
[52] U.S. Cl. .................... 250/334; 244/3.16
[58] Field of Search ............ 89/1.813, 41.06, 41.05; 244/3.12, 3.16; 250/334

[56] References Cited

U.S. PATENT DOCUMENTS

| | | | |
|---|---|---|---|
| 3,986,682 | 10/1976 | Dryden | 244/3.16 X |
| 5,005,083 | 4/1991 | Grage et al. | 358/181 |
| 5,062,586 | 11/1991 | Hobson et al. | 244/3.12 |
| 5,123,327 | 6/1992 | Alston et al. | 89/1.813 |
| 5,129,309 | 7/1992 | Lecuyer | 89/41.06 |
| 5,140,416 | 8/1992 | Tinkler | 358/88 |

Primary Examiner—Mark Hellner
Attorney, Agent, or Firm—D. Schron

[57] ABSTRACT

A method and apparatus for registering two images from different sensors including receiving a first and second image, detecting hot spots in the first and second images, respectively, pairing each of the hot spots in the first image with all the hot spots in the second image that are within a predetermined mapping distance to produce a mapping between the hot spots of the first and second images, refining the mapping produced by selecting one of the hot spots of the second image for each of the hot spots of the first image utilizing a least mean squares method, producing a registered image from the refined mapping, and outputting the registered image.

14 Claims, 4 Drawing Sheets

METHOD AND APPARATUS FOR REGISTERING TWO IMAGES FROM DIFFERENT SENSORS

BACKGROUND OF THE INVENTION

1. Field of the Invention

This invention relates generally to an image registration system for registering two images from two separately located sensors and more particularly to an image registration system for registering an image from a forward-looking infrared navigation and target acquisition/tracking system on an aircraft and an image from a weapon system being delivered to a target by the aircraft.

2. Description of the Prior Art

Forward-looking Infrared (FLIR) systems are generally known, particularly, as they relate to their use in connection with military aircraft which are required to fly at low altitude and acquire targets at night for the purpose of delivering armament or ordnance against them.

A FLIR system can be used to perform a variety of functions. These range from all-weather navigation aids to active air-air search and track. One use of the FLIR system is for aiding delivery of infrared (IR) missile weapons systems to a designated target. Target acquisition can be performed using infrared sensors on the aircraft having a greater range than the missile's sensors. Registration of the aircraft image with the missile image would allow for automatic delivery of a the missile at maximum range from a heads up display (HUD). This is in contrast to the current system which requires the pilot to use a cockpit display to acquire targets on inferior missile imagery and command launch equipment.

In order for the FLIR system to control the missile, the images produced by the two systems must be registered. Using direction information from the FLIR gimbal subsystem, the system can slew the missile sensor to the same approximate target location. The precise location will not be known due to several factors. The first of these is the spatial difference in location of the FLIR system and missile sensors. On an aircraft in flight, a missile, mounted under the wing, will undergo constant movement with respect to the infrared sensor mounted on the fuselage resulting in inconsistent spatial separation. Related to this are problems with improper alignment of the missile during mounting which can result in a translation and rotation of the infrared sensor of the missile from its nominal position. Another problem which complicates the registration is the difference in optics and sensitivity between the two sensors. While the FLIR sensor typically has a linear mapping in all directions of all points on the sensor, a missile normally has "fisheye" optics which result in a nonlinear mapping with higher resolution in the center. Further, the registration must be highly precise. At a distance of two miles, a 0.1 degree aiming difference results in a lateral difference of over eighteen (18) feet, the size of a typical target.

The image registration must compare the two images to determine the mapping from one to the other. A conventional method of analyzing the images would be to compare the two images on a pixel by pixel basis. This however would require a large number of operations. Furthermore, a 592×480 FLIR image frame has a total of 284K pixels which would have to be individually mapped and compared with the missile image pixels. Instead of comparing each individual pixel, the method and apparatus the present application compare the image "hot spots". The image "hot spots" are provided by a target detector such as a double window filter. Given that the registration is to be performed on the hot spots, the problem becomes one of determining the best mapping from the hot spot coordinates of one image to the corresponding coordinates of the other. The method and apparatus for registering two images is described herein. It should be noted that the method and apparatus of the present application can be used for registration of any images, not just those from the system to be described.

SUMMARY OF THE INVENTION

It is a primary object of the present invention, therefore, to provide an efficient and accurate method and apparatus for mapping the hot spots of a first image to a second image, in order to correlate the two images.

It is a primary object of the present invention, therefore, to provide an improvement in forward-looking infrared (FLIR) systems which provides registration between an image generated from a infrared sensor mounted on an aircraft and an image generated from a guided missile infrared sensor in order to allow automatic delivery of the weapon at maximum range from a heads up display.

Briefly, the foregoing and other objects are achieved by a method and apparatus for registering two images from different sensors including receiving a first and second image, detecting hot spots in the first and second images, respectively, pairing each of the hot spots in the first image with all the hot spots in the second image that are within a predetermined mapping distance to produce a mapping between the hot spots of the first and second images, refining the mapping produced by selecting one of the hot spots of the second image for each of the hot spots of the first image utilizing a least mean squares method, producing a registered image from the refined mapping, and outputting the registered image.

Further scope of the applicability of the present invention will become apparent from the detailed description given hereinafter. However, it should be understood that the detailed description and specific examples, while indicating preferred embodiments of the invention, are given by way of illustration only, since various changes and modifications coming within the spirit and scope of the invention will become apparent to those skilled in the art from this detailed description.

BRIEF DESCRIPTION OF THE DRAWINGS

The following detailed description of the invention will be more readily understood when considered together with the accompanying drawings in which.

DETAILED DESCRIPTION OF THE INVENTION

Figure 1:
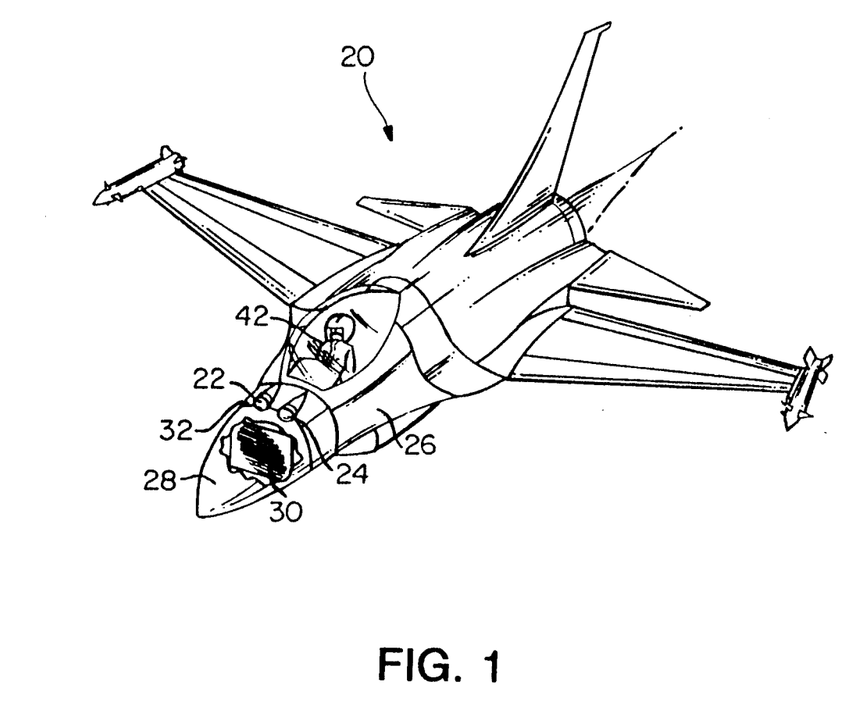
FIG. 1 is a perspective view of an aircraft which operates as an operational platform for one embodiment of the subject invention.

Referring now to the drawings wherein like reference numerals refer to like components throughout, reference is first made to FIG. 1 which illustrates a typical operating environment for the embodiment of the subject invention which includes an aircraft 20 including two (2) forward-looking infrared (FLIR) turrets 22 and 24 which are located side by side on the front portion of the fuselage 26 behind a radome 28 which covers a fire control radar system antenna 30. The two turrets 22 and 24 operate as housings for two (2) optical gimbal assembles, not shown, one of which 24 is used for target acquisition and tracking, hereinafter referred to as "targeting", while the other 22 is used for pilot navigation, herein referred to as "pilotage". The targeting and pilotage gimbal assemblies are interchangeable. The gimbals comprise stabilized receiving lens and mirror apparatus which fold the infrared (IR) energy in respective lines of sight to an optical multiplexer and IR detector.

Figure 2:
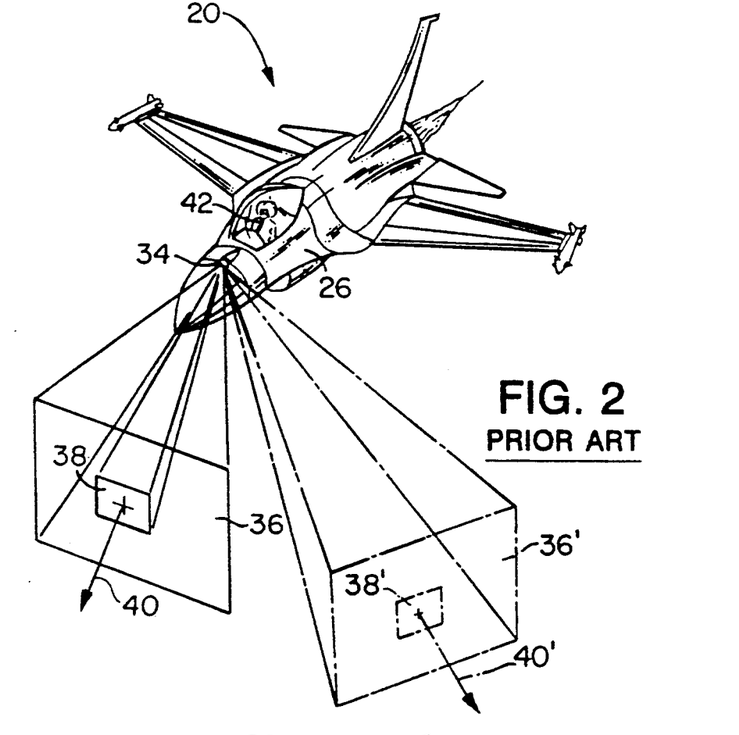
FIG. 2 is a perspective view of an aircraft which is equipped with a FLIR system in accordance with the known prior art.

The FLIR system illustrated in FIG. 2, discloses a prior art system including a single FLIR turret 34 which generates two (2) fields of view 36 and 38 along a single line of sight 40. This means that a pilot 42 flying the aircraft 20 while having an enlarged field of view 36 which is slaved to a helmet mounted sight and display, (HMS/D), not shown, and is used for pilotage, also includes a relatively smaller field of view 38 which is used for limited targeting. It can be seen then that the pilot's line of sight 40 must normally change from a direction about the aircraft's velocity vector while he is flying the aircraft 20 and in the enlarged field of view 36 to the direction 40' of the target location while he is searching for and tracking the target while in the smaller field of 38' as the pilot 42 maneuvers the aircraft for attack and weapon delivery.

Such a prior art system provides an inherent limitation. The pilot must alternate his head position between the navigation line of sight 40 and the targeting line of sight 40', thereby interrupting his situational awareness which could affect his reaction time and accordingly his ability to fly the aircraft 20 along a predetermined flight path for executing a successful first pass attack.

Figure 3:
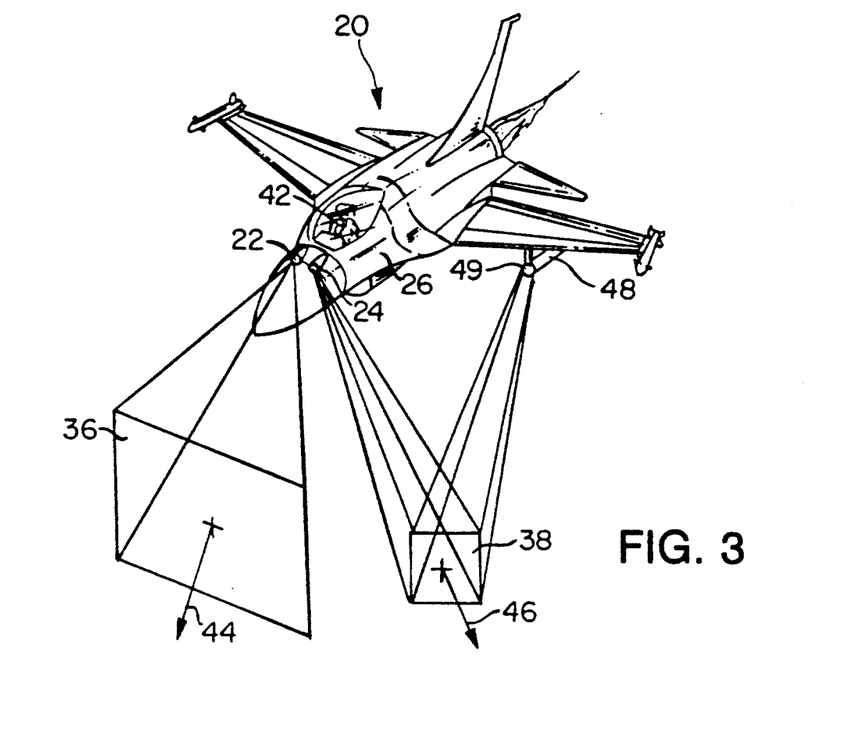
FIG. 3 is a perspective view of an aircraft which is equipped with a dual line of sight FLIR system, illustrating the interaction between the two sensors.

An improved system solves this problem by having two FLIR turrets 22 and 24, which generate respective pilotage and targeting fields of view 36 and 38 along two (2) separate and independently controlled lines of sight 44 and 46, as shown in FIG. 3. Further, a weapons system such a guided missile 48 with an infrared imaging sensor 49 can be made to slave to the targeting field of view 38.

The method and apparatus of the present application perform image registration between the image obtained from turret 24 on the aircraft 20 and the image obtained from the IR imaging sensor 49 on the missile 48, in order to provide automatic delivery of the missile 48 at maximum range from a heads up display.

Figure 4:
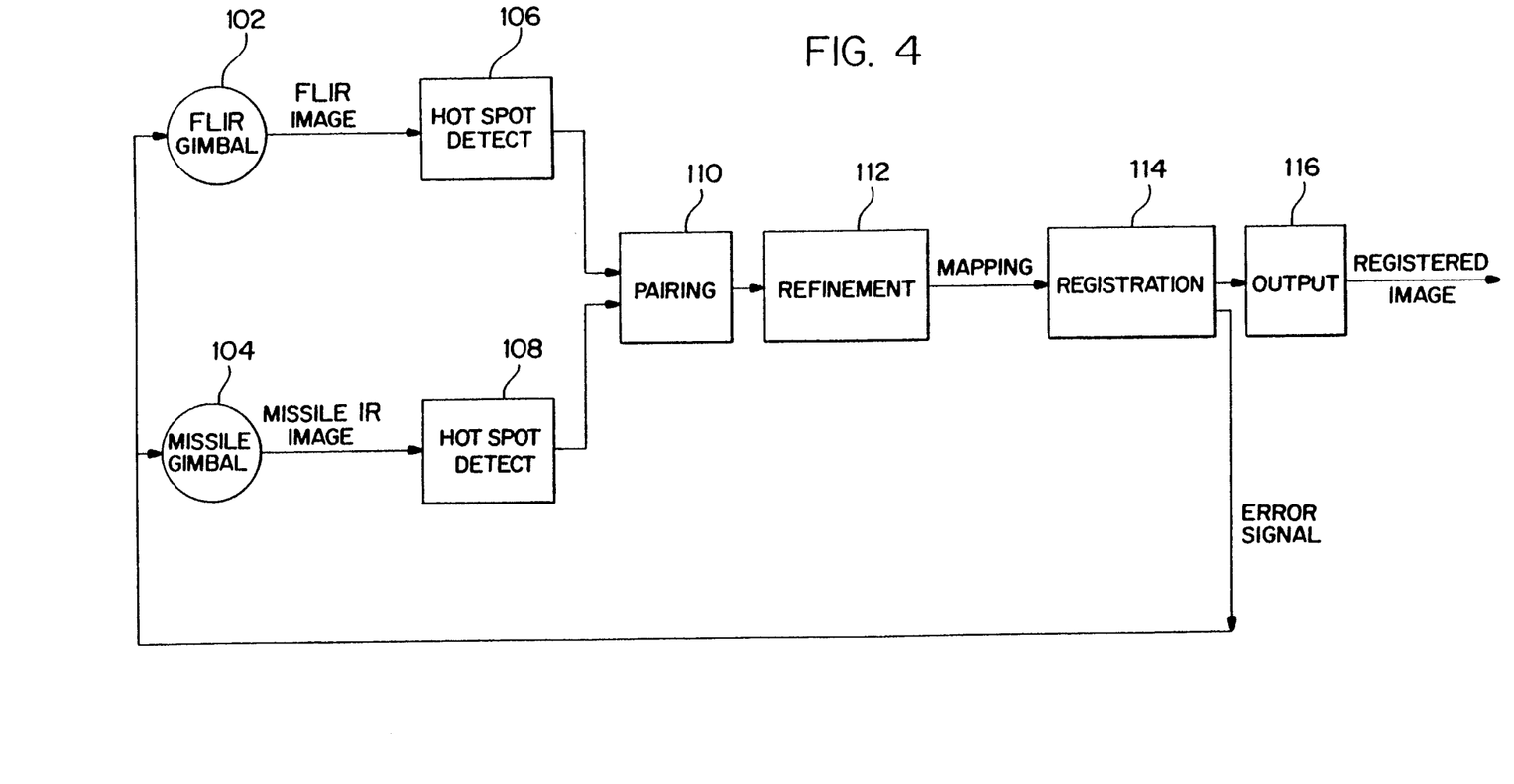
FIG. 4 is a block diagram of one embodiment of the present invention.

As shown in FIG. 4, a first image hereinafter referenced to as the FLIR image, is received from the turret gimbal 102 on the aircraft and a second image, hereinafter referred to as the missile IR image, is received from the missile gimbal 104. Hot spots are detected in the FLIR image by hot spot detector 106 and hot spots are detected in the missile IR image using hot spot detector 108. The hot spots of both images are input to a pairing device 110, wherein the hot spots from each of the two input images are paired using a predetermined mapping function. This mapping is refined in a refinement device 112, using a least mean squares method and the refined mapping is input to a registration device 114 and then output via an output device 116. Additionally, the refinement device 112 produces an error signal which is fed back to the gimbals 102 and 104 as a feedback loop signal.

Registration is the determination of the continuous mapping from one image to another. The registration problem is simplified by considering only a small set of hot spots. Using this technique, registration begins with finding hot spot coordinates $f_i$ on the FLIR image produced by either FLIR turret 22 or 24. The locations of such hot spots are typically available from a target detection algorithm used in such systems. Once found, the location of missile IR image hot spots are estimated by applying a nominal mapping to the FLIR image hot spots where $m_i$ = Mapping $(f_i)$. The exact location of the missile IR image hot spots $m_i$, are then refined by searching near the estimate $m_i$ with the target detection algorithm.

If no missile IR image hot spots can be located near estimate $m_i$, then that index is dropped from use in registration. If multiple hot spots are found near $m_i$, then the relative proximity and intensity of hot spots are used to resolve ambiguity. Once hot spot coordinate pairs $(f_i, m_j)$ are determined, the nominal parameters in the mapping m = Mapping(f) are refined.

The method and apparatus of the present application determine the mapping parameters which minimize the mean square distance from the mapped FLIR image coordinates, mapping$(f_i)$ to actual missile IR image coordinates, $m_i$. The method and apparatus of the present application includes the steps of target detection and pairing one image's coordinates with another image's coordinates, as well the step of refining the exact location of the map hot spots. In order to prepare the two images for registration, first, translation errors and rotation errors which result from the separate locations of the turret sensor and the missile IR image sensor must be corrected.

Translation errors are an x and/or y shift from FLIR image to missile IR image coordinates. Translation errors can arise from a mounting error of the missile and flexure of the wings and fuselage connecting the FLIR and missile sensors. Translation effects can be compensated for by adding an offset, where:

$$m = \begin{bmatrix} mx \\ my \end{bmatrix} = \text{missile coordinate} \quad (1)$$

$$m = f + b \quad f = \begin{bmatrix} fx \\ fy \end{bmatrix} = \text{FLIR coordinate}$$

$$b = \begin{bmatrix} bx \\ by \end{bmatrix} = \text{offset coordinate}$$

Figure 5A:
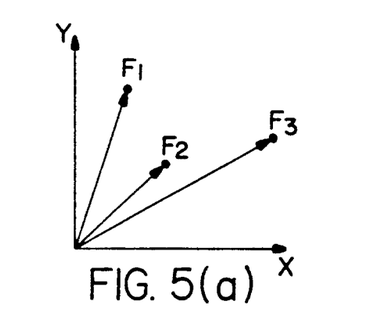
FIGS. 5(a) and 5(b) illustrate the correction of a translation error between the FLIR image and the missile IR image.
Figure 5B:
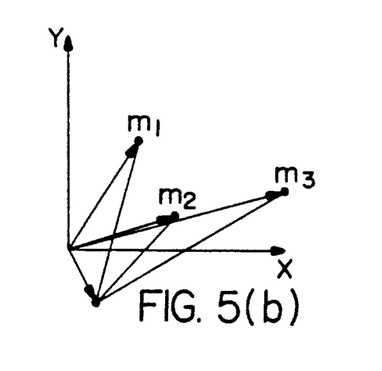

The correction of translation errors is illustrated in FIGS. 5(a) and 5(b).

Rotation errors are the result of the aircraft's FLIR image being rolled with respect to the missile's IR image. Rotation errors can arise for the same reasons as translation errors. Also, scaling may be necessary due to difference magnifications between the FLIR and missile optics. Rotation and scaling effects are compensated for by a 2×2 linear transformation, where:

$$m = AF \quad (2)$$

$$\begin{bmatrix} mx \\ my \end{bmatrix} = \begin{bmatrix} a_{11} & a_{12} \\ a_{21} & a_{22} \end{bmatrix} \begin{bmatrix} fx \\ fy \end{bmatrix}$$

Figure 6A:
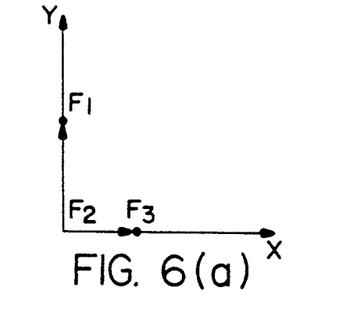
FIGS. 6(a) and 6(b) illustrate the correction of a rotation error between the FLIR image and the missile IR image.
Figure 6B:
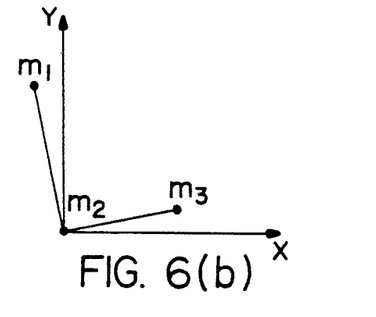

The correction of rotation errors is illustrated in FIGS. 6(a) and 6(b).

Nonlinearities are accounted for by compensation proportional to $fx^2$, $fy^2$, $fxfy$, $e^{fx}$, or any other non-linear function. For example a fish-eye lens is additionally compensated for by parameters proportional to the Kronecker product as shown below, where:

$m = A(f(x)f)$ where $(x)$ indicates the Kronecker product and $$\begin{bmatrix} fx \\ fy \end{bmatrix} (x) \begin{bmatrix} fx \\ fy \end{bmatrix} = \begin{bmatrix} fx^2 \\ fxfy \\ fy^2 \end{bmatrix} \quad (3)$$

$$\begin{bmatrix} mx \\ my \end{bmatrix} = \begin{bmatrix} a_{11} & a_{12} & a_{13} \\ a_{21} & a_{22} & a_{23} \end{bmatrix} \begin{bmatrix} fx^2 \\ fxfy \\ fy^2 \end{bmatrix} \quad (4)$$

Figure 7A:
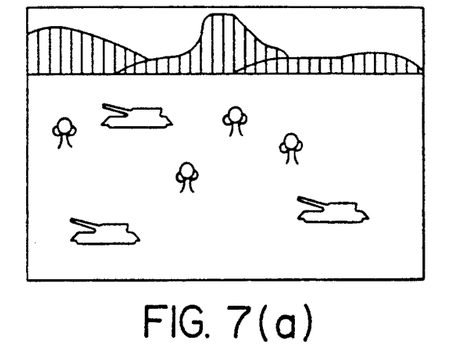
FIGS. 7(a) and 7(b) illustrate the differences in the FLIR image and the missile IR image as a result of translation errors, rotation errors, and optical nonlinearities.
Figure 7B:
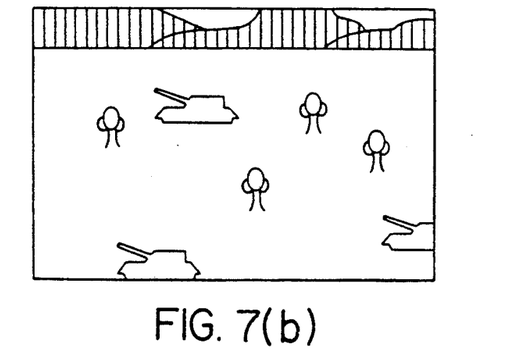

Translation errors, rotation errors, and optical nonlinearities are the primary reasons why the FLIR image and the missile IR image differ at any given time. The difference between the FLIR image and the missile IR image is illustrated in FIGS. 7(a) and 7(b).

Once the translation and rotation errors are corrected for by adding off-set coordinates, the step of parameter refinement may be performed.

The primary criterion for parameter refinement is that each mapped FLIR image coordinate should be near the corresponding missile IR image coordinate. Just as it may not be possible to draw a straight line through three or more points, it may not be possible to choose parameters which perfectly map FLIR image to missile image coordinates. The criterion for the best line which goes through three or more points may be the line which minimizes the average squared distance from each point to the line. Similarly, the criterion for the best mapping from FLIR image to missile image coordinates is the plane which minimizes the average squared distance from each point to the plane.

If the first criterion is met perfectly, then there is a second criterion. The parameters of the mapping should be as close as possible to nominal. For example, if one point was available to determine the equation of a line, choose the line which goes through the point that has parameters as close as possible to nominal.

To illustrate this step, assume translation and rotation/scaling mapping are sufficient for good image registration. The mapping from FLIR to missile IR coordinates would be as follows:

$$\begin{bmatrix} mx \\ my \end{bmatrix} = \begin{bmatrix} a_{11} & a_{12} \\ a_{21} & a_{22} \end{bmatrix} \begin{bmatrix} fx \\ fy \end{bmatrix} + \begin{bmatrix} b_1 \\ b_2 \end{bmatrix} \quad (5)$$

Nominally the mapping parameters are known to be $A = \hat{A}$, $b = \hat{b}$. For instance, $$A = \begin{bmatrix} 1.2 & 0.0 \\ 0.0 & 1.2 \end{bmatrix}, b = \begin{bmatrix} 0 \\ 0 \end{bmatrix} \quad (6)$$

might be the mapping when the missile is mounted properly and when the wings of the aircraft are not under the stress of a turn. When conditions other than nominal exist, the parameters $A = \hat{A}$ and $b = \hat{b}$ can be refined by registering hot spots.

The refinement problem can be written as:

$$\text{given } f_i = \begin{bmatrix} fx \\ fy \end{bmatrix}_i = \begin{array}{l} \text{FLIR image coordinates of } i\text{th} \\ \text{hot spot, number of hot spots} \end{array} \quad (7)$$

$$m_i = \begin{bmatrix} mx \\ my \end{bmatrix}_i = \begin{array}{l} \text{missle IR image coordinates of } i\text{th} \\ \text{hot spot, numer of hot spots} \end{array} \quad (8)$$

$$\text{find } A = \begin{bmatrix} a_{11} & a_{12} \\ a_{21} & a_{22} \end{bmatrix}, b = \begin{bmatrix} b_1 \\ b_2 \end{bmatrix} \text{ such that} \quad (9)$$

error = SUM $||Af_i + b - m_i||^2/(\#\text{hot spots})$ is a minimum and if error is zero, then choose the parameters such that additionally, error2 = SUM $(\text{parameter}_i - \text{parâmeter}_i)^2/(\#\text{parameters})$ is a minimum.

Rewriting these equations using vector notation simplifies the expression to the following:

$$\min_c ||c - \hat{c}||^2 \quad (10)$$

where:
||Gc−h||² is a minimum,
(Gc−h) is the vector of the mapped-measured error,
||Gc−h||² is the square error,
$c = [a_{11}\ a_{21}\ a_{12}\ a_{22}\ b_1\ b_2]^T$ and is a member of n*1 reals,
G = a sample data matrix equal to:

$$G = \begin{bmatrix} fx_1 & 0 & fy_1 & 0 & 1 & 0 \\ 0 & fx_1 & 0 & fy_1 & 0 & 1 \\ fx_2 & 0 & fy_2 & 0 & 1 & 0 \\ 0 & fx_2 & 0 & fy_2 & 0 & 1 \\ & & \vdots & & & \\ fx_\# & 0 & fy_\# & 0 & 1 & 0 \\ 0 & fx_\# & 0 & fy_\# & 0 & 1 \end{bmatrix} \quad (11)$$

$\hat{c}$ are the nominal or last known parameters,
$h = [mx_1\ my_1\ mx_2\ my_2 \ldots mx\#\ my\#]^T$ is a member of m*1 reals, and
# = #hot spots The method used to solve for A and b will depend upon the number of hot spot coordinates available. In general, the number of hot spots will be greater than three. In this case, the six unknowns $a_{11}$, $a_{12}$, $a_{21}$, $a_{22}$, $b_1$, and $b_2$ will be overdetermined. There will be six unknowns, but more than six equations. As mentioned before, the average square error will be minimized. The parameters c are solved for by setting the gradient of the mean square error with respect to c equal to zero and then solving for c.

$$\begin{aligned}||Gc - h||^2 &= (Gc - h)^T(Gc - h) \\ &= (c^TG^T - h^T)(Gc - H) \\ &= c^TG^TGc - h^TGc - c^TG^Th + h^Th \\ &= c^TG^TGc - 2h^TGc + h^Th \\ \Delta c\,||Gc - h||^2 &= 2G^TGc - 2G^Th \end{aligned} \quad (13)$$

Setting $\Delta c ||Gc-h||^2 = 0$ gives $G^TGc = G^Th$ or $c = G^+h$ where $G^+ = (G^TG)^{-1}G^T$ is the Moore-Penrose pseudo-inverse of G.

A solution based on a $MD^{-1}R$ factorization of the matrix G simplifies the problem. This factorization always exists. The matrix M is chosen such that $M^TM = D$ where D is a diagonal matrix and $M^T$ is the transpose of the matrix M. The matrix $Q = MD^{-\frac{1}{2}}$ is a unitary matrix, meaning $Q^TQ = I$, where I is an identity matrix. This implies numerical stability of the factorization. Matrix R is upper triangular. Further, the upper triangular portion of R is invertible if matrix G has full rank. The full rank criteria is satisfied if G has full rank which implies there are three or more unique hot spots. For correcting translation and rotation errors, there must be enough FLIR/missile IR (F,M) pairs to guarantee G is a full rank matrix. In general, the number of (F,M) pairs must be at least half the number of unknowns being solved for in the mapping.

In summary the matrixes M, Q, R, and D are chosen such that $$G = MD^{-1}\tilde{R} = QR \quad (14)$$

$$Q = MD^{-\frac{1}{2}}, \text{ and} \quad (15)$$

$$R = D^{-\frac{1}{2}}\tilde{R}. \quad (16)$$

where:
$Q^TQ = I$,
$M^TM = D$, and
R is upper triangular and invertible.

The optimum solution is found by finding C such that $G^TGC = G^Th$

First, $MD^{-1}\tilde{R}$ is substituted for G, giving $$(MD^{-1}\tilde{R})^T(MD^{-1}\tilde{R})c = (MD^{-1}\tilde{R})^Th \quad (17)$$

$$\tilde{R}^TD^{-1}M^TMD^{-1}\tilde{R}c = \tilde{R}^TD^{-1}M^Th \quad (18)$$

$$\tilde{R}^TD^{-1}\tilde{R}^Tc = R^TD^{-1}M^Th \quad (19)$$

$$D^{-1}\tilde{R}^Tc = D^{-1}M^Th \quad (20)$$

$$\tilde{R}^Tc = M^Th \quad (21)$$

c represents the n overdetermined unknowns which can be solved for using M = (2* the number of hot spots) equations.

The resulting mean error (rme) is shown below:

$$rme = h1(n+1:m)\ D^{-1}(n+1:m)\ h1\ (n+1:m) \quad (22)$$

and represents the registration accuracy of the two images. First matrixes D, R and $h1 = M^Th$ must be found such that $$G = MD^{-1}\tilde{R} \text{ and} \quad (23)$$

$$M^TM = D. \quad (24)$$

Next, C must be found such that $RC = h1(1:n)$ by back-substitution. The first step requires $n^2(m-n/3) + O(mn)$ operations to complete and the second step requires $n^2$ operations for a total of $n^2(m-n/3+1) + O(mn)$ operations.

In addition to the general solution discussed above where three or more hot spots are present, there are two underdetermined cases - where only one or two hot spots are available for registration. These cases do not allow for an explicit determination of all the parameters in the mapping. The parameters can however be determined given sufficient external constraints. The constraint chosen is to minimize the difference between the nominal and calculated parameter values.

For the single point case the mapping equation is as follows:

$$\begin{bmatrix} a_{11} & a_{12} \\ a_{21} & a_{22} \end{bmatrix} \begin{bmatrix} f_x \\ f_y \end{bmatrix} + \begin{bmatrix} b_1 \\ b_2 \end{bmatrix} = \begin{bmatrix} m_x \\ m_y \end{bmatrix} \quad (25)$$

solving for $b_1$ and $b_2$ gives:

$$b_1 = m_x - a_{11}f_x - a_{12}f_y$$

$$b_2 = m_y - a_{21}f_x - a_{22}f_y$$

the difference between the nominal and calculated values is:

$$\begin{aligned}||a - \hat{a}||^2 &= (a_{11} - \hat{a}_{11})^2 + (a_{12} - \hat{a}_{12})^2 + \\ &\quad (a_{21} - \hat{a}_{21})^2 + (a_{22} - \hat{a}_{22})^2 + (b_1 - \hat{b}_1)^2 + \\ &\quad (b_2 - \hat{b}_2)^2 \end{aligned} \quad (26)$$

Substituting for $b_1$ and $b_2$ gives:

$$||a - \hat{a}||^2 = (a_{11} - \hat{a}_{11})^2 + (a_{12} - \hat{a}_{12})^2 + \quad (27)$$
$$(a_{21} - \hat{a}_{21})^2 + (a_{22} - \hat{a}_{22})^2 +$$
$$(m_x - a_{11}f_x - a_{12}f_y - \hat{b}_1)^2 +$$
$$(m_y - a_{21}f_x - a_{22}f_y - \hat{b}_2)^2$$

Taking the derivative of this function with respect to $a_{11}$, $a_{12}$, $a_{21}$, and $a_{22}$ yields four simultaneous equations with four unknowns. Solving for $a_{11}$ and $a_{21}$ and then backsubstituting for $a_{12}$ and $a_{22}$ with a final back substitution for $b_1$ and $b_2$ yields the following solution:

$$a_{11} = \frac{f_x m_x + \hat{a}_{11} f_y^2 - \hat{a}_{12} f_x f_y - \hat{b}_1 f_x + \hat{a}_{11}}{f_x^2 + f_y^2 + 1} \quad (28)$$

$$a_{21} = \frac{f_x m_y + \hat{a}_{21} f_y^2 - \hat{a}_{22} f_x f_y - \hat{b}_2 f_x + \hat{a}_{21}}{f_x^2 + f_y^2 + 1} \quad (29)$$

$$a_{12} = \frac{f_x m_x + \hat{a}_{11} f_x^2 - \hat{b}_1 f_x + \hat{a}_{11} - a_{11}}{f_x f_y} \quad (30)$$

$$a_{22} = \frac{f_x m_y + a_{21} f_x^2 - \hat{b}_2 f_x + \hat{a}_{21} - a_{21}}{f_x f_y} \quad (31)$$

$$b_1 = m_x - a_{11} f_x - a_{12} f_y \quad (32)$$

$$b_2 = m_y - a_{21} f_x - a_{22} f_y \quad (33)$$

For the two point case, the equations are:

$$\begin{bmatrix} a_{11} & a_{12} \\ a_{21} & a_{22} \end{bmatrix} \begin{bmatrix} f_{x1} \\ f_{y1} \end{bmatrix} + \begin{bmatrix} b_1 \\ b_2 \end{bmatrix} = \begin{bmatrix} m_{x1} \\ m_{y1} \end{bmatrix} \text{ and}$$

$$\begin{bmatrix} a_{11} & a_{12} \\ a_{21} & a_{22} \end{bmatrix} \begin{bmatrix} f_{x2} \\ f_{y2} \end{bmatrix} + \begin{bmatrix} b_1 \\ b_2 \end{bmatrix} = \begin{bmatrix} m_{x2} \\ m_{y2} \end{bmatrix} \quad (35)$$

Solving for $b_1$, $b_2$, and $a_{21}$ and $a_{12}$ gives:

$$b_1 = \frac{f_{y1}(a_{11}f_{x2} - m_{x2}) + f_{y2}m_{x1} - a_{11}f_{x1}f_{y2}}{f_{y1} - f_{y2}} \quad (36)$$

$$b_2 = \frac{f_{x1}(m_{y2} - a_{22}f_{y2}) - f_{x2}m_{y1} + a_{22}f_{x2}f_{y1}}{f_{x1} - f_{x2}} \quad (37)$$

$$a_{12} = \frac{-m_{x2} + m_{x1} + a_{11}f_{x2} - a_{11}f_{x1}}{f_{y1} - f_{y2}} \quad (38)$$

$$a_{21} = \frac{m_{y2} - m_{y1} - a_{22}f_{y2} + a_{22}f_{y1}}{f_{x1} - f_{x2}} \quad (39)$$

The difference equation is still defined as:

$$\left\|\begin{matrix} a - \hat{a} \\ b - \hat{b} \end{matrix}\right\|^2 = (a_{11} - \hat{a}_{11})^2 +$$
$$(a_{12} - \hat{a}_{12})^2 +$$
$$(a_{21} - \hat{a}_{21})^2 +$$
$$(a_{22} - \hat{a}_{22})^2 +$$
$$(b_1 - \hat{b}_1)^2 +$$
$$(b_2 - \hat{b}_2)^2 \quad (40)$$

substituting for $b_1$, $b_2$, $a_{21}$ and $a_{12}$ gives:

$$\left\|\begin{matrix} a - \hat{a} \\ b - \hat{b} \end{matrix}\right\|^2 = (a_{11} - \hat{a}_{11})^2 + \quad (41)$$

$$\left(\frac{-m_{x2} - m_{x1} - a_{11}f_{x1}}{f_{y1} - f_{y2}} - \hat{a}_{12}\right)^2 +$$

$$\left(\frac{m_{y2} - m_{y1} - a_{22}f_{y2} + a_{22}f_{y1}}{f_{x1} - f_{x2}} - \hat{a}_{21}\right)^2 + (a_{22} - \hat{a}_{22})^2 +$$

$$\left(-\frac{f_{y1}(a_{11}f_{x2} - m_{x2}) + f_{y2}m_{x1} - a_{11}f_{x1}f_{y2}}{f_{y1} - f_{y2}} - \hat{b}_1\right)^2 +$$

$$\left(\frac{f_{x1}(m_{y2} - a_{22}f_{y2}) - f_{x2}m_{y1} + a_{22}f_{x2}f_{y1}}{f_{x1} - f_{x2}} - \hat{b}_2\right)^2$$

Taking the derivative of this function with respect to $a_{11}$ and $a_{22}$ and equating to zero yields two simultaneous equations with two unknowns. Solving for these and back substituting yields the following solution:

$$a_{11} = -(f_{x1}f_{y1}f_{y2}m_{x2} - f_{x2}f_{y1}^2m_{x2} - f_{x2}m_{x2} + f_{x1}m_{x2} - \quad (42)$$
$$f_{x1}f_{y2}^2m_{x1} + f_{x2}f_{y1}f_{y2}m_{x1} + f_{x2}m_{x1} - f_{x1}m_{x1} + \hat{b}_1f_{x1}f_{y2}^2 -$$
$$\hat{a}_{11}f_{y2}^2 - \hat{b}_1f_{x2}f_{y1}f_{y2} - \hat{b}_1f_{x1}f_{y1}f_{y2} + 2\hat{a}_{11}f_{y1}f_{y2} +$$
$$\hat{a}_{12}f_{x2}f_{y2} - \hat{a}_{12}f_{x1}f_{y2} + \hat{b}_1f_{x2}f_{y1}^2 - \hat{a}_{11}f_{y1}^2 -$$
$$a_{12}f_{x2}f_{y1} + a_{12}f_{x1}f_{y1})/(f_{x1}^2f_{y2}^2 + f_{y2}^2 - 2f_{x1}f_{x2}f_{y1}f_{y2} -$$
$$2f_{y1}f_{y2} + f_{x2}^2f_{y1}^2 + f_{y1}^2 + f_{x2}^2 - 2f_{x1}f_{x2} + f_{x1}^2)$$

$$a_{22} = +(f_{x1}^2f_{y2}m_{y2} + f_{y2}m_{y2} - f_{x1}f_{x2}f_{y1}m_{y2} - f_{y1}m_{y2} - \quad (43)$$
$$f_{x1}f_{x2}f_{y2}m_{y1} - f_{y2}m_{y2} + f_{x2}^2f_{y1}m_{y1} + f_{y1}m_{y1} + \hat{b}_2f_{x1}f_{x2}f_{y2} -$$
$$\hat{a}_{21}f_{x2}f_{y2} - \hat{b}_2f_{x1}f_{y2} + \hat{a}_{21}f_{x1}f_{y2} - \hat{b}_2f_{x2}^2f_{y1} +$$
$$\hat{b}_2f_{x1}f_{x2}f_{y1} + \hat{a}_{21}f_{x2}f_{y1} - \hat{a}_{21}f_{x1}f_{y1} + \hat{a}_{22}f_{x2}^2 -$$
$$2\hat{a}_{22}f_{x1}f_{x2} + \hat{a}_{22}f_{x1}^2)/(f_{x1}^2f_{y2}^2 + f_{y2}^2 -$$
$$2f_{x1}f_{x2}f_{y1}f_{y2} - 2f_{y1}f_{y2} + f_{x2}^2f_{y1}^2 + f_{y1}^2 + f_{x2}^2 - 2f_{x1}f_{x2} + f_{x1}^2)$$

$$a_{21} = -\frac{m_{y2} - m_{y1} - a_{22}f_{y2} + a_{22}f_{y1}}{f_{x1} - f_{x2}} \quad (44)$$

$$a_{21} = \frac{-m_{x2} + m_{x1} + a_{11}f_{x2} - a_{11}f_{x1}}{f_{y1} - f_{y2}} \quad (45)$$

-continued $$b_1 = m_{x1} - a_{12}f_{y1} - a_{11}f_{x1} \quad (46)$$

$$b_2 = m_{y1} - a_{22}f_{y1} - a_{21}f_{x1} \quad (47)$$

As disclosed above, the method and apparatus of the present application register two images from different sensors by pairing hot spots from each of the two images and refining the pairing using the least mean squares method, in order to produce a registered image from the two different sensor images. This registration device is capable of handling non-linearities between the two images, such as optical and sensitivity nonlinearities. Further, refinement using least means squares method reduces the number of operations and the efficiency of the process. Finally, in one preferred embodiment, registration of the two images is simplified via the use of available FLIR features which include existing detection and pairing components.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. An image registration apparatus comprising:
   first input means for receiving a first image;
   second input means for receiving a second image;
   first detecting means for detecting hot spots in the first image;
   second detection means for detecting hot spots in the second image;
   pairing means for pairing each of the hot spots in the first image with all the hot spots in the second image that are within a predetermined mapping distance to produce a mapping between the hot spots of the first and second images;
   refining means for refining the mapping produced by said pairing means by selecting one of the hot spots of the second image for each of the hot spots of the first image;
   wherein said refining means utilizes a least mean squares method for determining the selected one of the hot spots of the second image for each of the hot spots of the first image;
   registration means for producing a registered image from the refined mapping; and
   output means for outputting the registered image.

2. The image registration apparatus of claim 1, wherein said refining means produces an error signal representative of a difference between the selected one of the hot spots of the second image and the hot spot of the first image for each of the hot spots of the first image, said error signal being fed back to said first and second input means as a control loop signal.

3. The image registration apparatus of claim 1, wherein said first input means is a FLIR system gimbal and the first image is a FLIR image and said second input means is a missile IR image gimbal and the second image is a missile IR image.

4. The image registration apparatus of claim 3, said pairing means including,
   translation means for correcting translational errors between said FLIR system gimbal and said missile IR image gimbal,
   rotation means for correcting for rotational errors between said FLIR image gimbal and said missile IR image gimbal, and
   optical means for correcting optical and sensitivity differences between said FLIR system gimbal and said missile IR image gimbal.

5. The image registration apparatus of claim 4, wherein said optical means corrects for non-linearities between the FLIR system gimbal and the missile IR image gimbal.

6. The image registration apparatus of claim 1, wherein said refining means refines the mapping by selecting the one of the hot spots of the second image, for each of the hot spots of the first image, with the smallest average squared distance from an optimal plane.

7. The image registration apparatus of claim 4, wherein the mapping to be refined is represented by:

$$\begin{bmatrix} mx \\ my \end{bmatrix} = \begin{bmatrix} a_{11} & a_{12} \\ a_{21} & a_{22} \end{bmatrix} \begin{bmatrix} fx \\ fy \end{bmatrix} + \begin{bmatrix} b_1 \\ b_2 \end{bmatrix}$$

where $\begin{bmatrix} mx \\ my \end{bmatrix}$ = missle IR image coordinates for a missle image $I$ $\begin{bmatrix} fx \\ fy \end{bmatrix}$ = FLIR image coordinates for a FLIR image hot spot $\begin{bmatrix} a_{11} & a_{12} \\ a_{21} & a_{22} \end{bmatrix}$ = is a rotation correction matrix and $\begin{bmatrix} b_1 \\ b_2 \end{bmatrix}$ = is a translation correction matrix.

8. An image registration method comprising the steps of:
   a) receiving a first image;
   b) receiving a second image;
   c) detecting hot spots in the first image;
   d) detecting hot spots in the second image;
   e) pairing each of the hot spots in the first image with all the hot spots in the second image that are within a predetermined mapping distance to produce a mapping between the hot spots of the first and second images;
   f) refining the mapping produced in said step e) by selecting one of the hot spots of the second image for each of the hot spots of the first image;
   wherein step f) utilizes a least mean squares method for determining the selected one of the hot spots of the second image for each of the hot spots of the first image;
   g) producing a registered image from the refined mapping; and
   h) outputting the registered image.

9. The image registration method of claim 8, wherein said step f) produces an error signal representative of a difference between the selected one of the hot spots of the second image and the hot spot of the first image for each of the hot spots of the first image, said error signal being fed back to said steps a) and b) as a control loop signal.

10. The image registration method of claim 8, wherein the first image is a FLIR system image and the second image is a missile IR image.

11. The image registration method of claim 10 said step e) including the sub-steps of,
  (e)(1) correcting for translational errors between the FLIR system image and the missile IR image,
  (e)(2) correcting for rotational errors between the FLIR system image and the missile IR image, and
  (e)(3) correcting for optical and sensitivity differences between the FLIR system image and the missile IR image.

12. The image registration method of claim 11, wherein said sub-step (e)(3) corrects for non-linearities between the FLIR system image and the missile IR image.

13. The image registration method of claim 8, wherein said step (e) refines the mapping by selecting the one of the hot spots of the said image, for each of the hot spots of the first image, with the smallest average squared distance from an optimal plane.

14. The image registration method of claim 11, wherein the mapping to be refined is represented by:

$$\begin{bmatrix} mx \\ my \end{bmatrix} = \begin{bmatrix} a_{11} & a_{12} \\ a_{21} & a_{22} \end{bmatrix} \begin{bmatrix} fx \\ fy \end{bmatrix} + \begin{bmatrix} b_1 \\ b_2 \end{bmatrix}$$

where:

$\begin{bmatrix} mx \\ my \end{bmatrix}$ = coordinates for a missle *IR* image hot spot $\begin{bmatrix} fx \\ fy \end{bmatrix}$ = coordinates for a *FLIR* image hot spot $\begin{bmatrix} a_{11} & a_{12} \\ a_{21} & a_{22} \end{bmatrix}$ = is a rotation correction matrix and $\begin{bmatrix} b_1 \\ b_2 \end{bmatrix}$ = is a translation correction matrix.

* * * * *